March 27, 1962 R. D. KODIS 3,027,545

MAGNETIC COMPUTING

Filed Nov. 26, 1954

INVENTOR
ROBERT D. KODIS
BY Elmer J. Gorn
ATTORNEY

United States Patent Office 3,027,545
Patented Mar. 27, 1962

3,027,545
MAGNETIC COMPUTING

Robert D. Kodis, Brookline, Mass., assignor to Raytheon Company, a corporation of Delaware Filed Nov. 26, 1954, Ser. No. 471,327
12 Claims. (Cl. 340—174)

This invention relates to computing, and particularly to the use of saturable magnetic elements in the handling of computations or analogous information in code pattern as, for example, binary code utilizing two contrasting digits adapted for representation in the form of two contrasting magnetic saturation conditions brought about alternately in each of said saturable magnetic elements by application of code-controlled pulse energy thereto.

Figure 1:
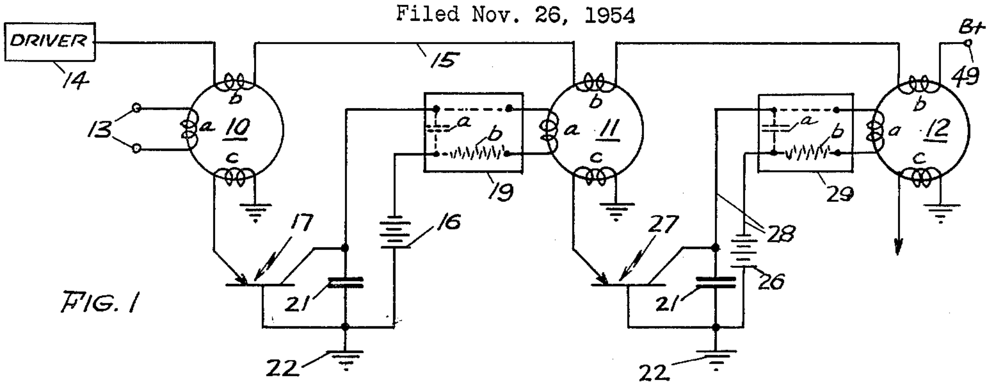
Figure 2:
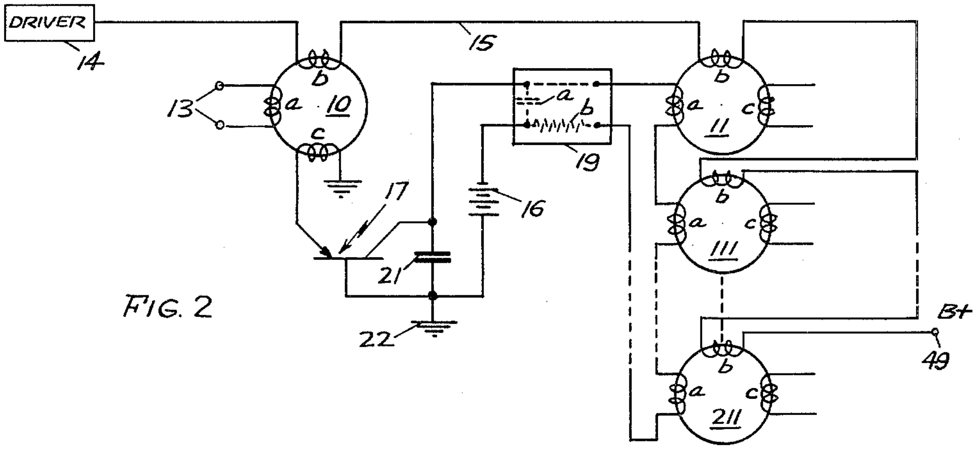
Figure 3:
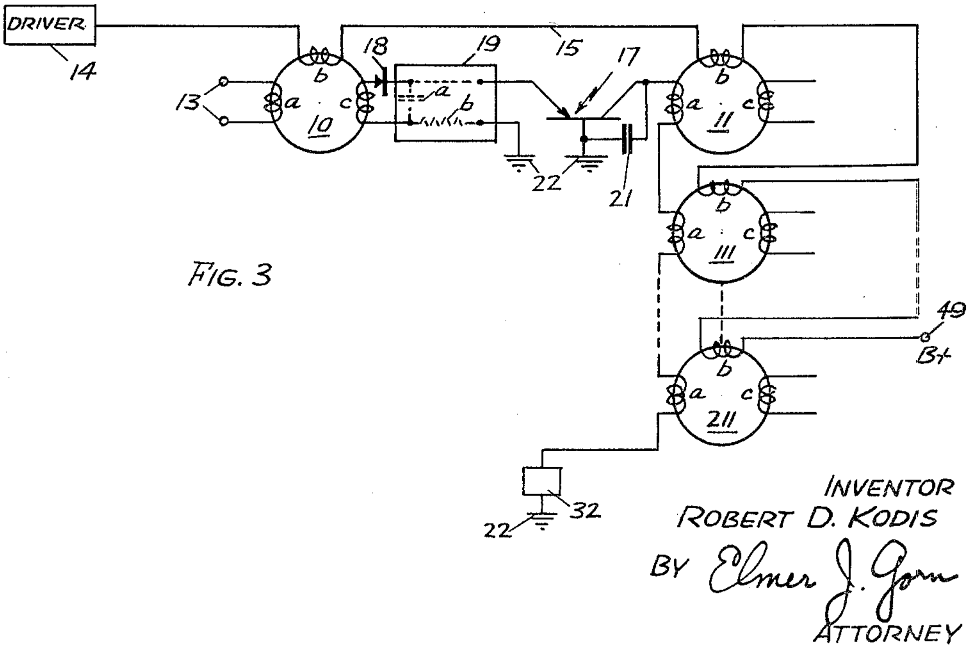

The invention is characterized by the introduction of a power amplifying stage between two successive saturable magnetic elements or equivalent functional stages in a computing register, which amplifying stage serves to enlarge the capabilities of the register, as for example, in the matter of permitting multiplication of branch circuits for performance of additional logical functions, or in any other respect requiring output at a higher power level The invention is herein illustrated and described in several forms it may assume, each of which forms incorporates a three-element semi-conductive device of the "transistor" category or its equivalent, as the inter-stage amplifying element. It is to be understood, however, that the invention is applicable to magnetic systems having inter-stage amplifiers incorporating electron discharge tubes or other types of current flow controlling and/or amplifying means to the extent that such other types of current flow controlling and/or amplifying means may be capable of functioning as electronic equivalents of the semiconductive solid state devices herein specifically represented. Accordingly, the invention is to be understood as being limited only by the scope of the inventive principles reflected herein, and not to the specific details illustrated in the accompanying drawing wherein:

FIG. 1 is a diagram of components and electrical connections constituting a multiple-core type of "single line" magnetic shift register incorporating the invention; and FIGS. 2 and 3 are diagrams showing alternate methods of incorporating the invention in a single line shift register.

All of the illustrated embodiments of the invention relate to the type of magnetic computer which has come to be known in the art as a "shift register." Briefly, such a shift register consists of a plurality of stages through which the coded information is progressively passed, with each stage including one or more toroidal magnetic cores composed of material having high magnetic retentivity and a relatively open hysteresis loop characteristic approaching the rectangular in contour. With such cores being utilized as receivers of information-representing current pulses, the effect of introduction of a current pulse of predetermined polarity into such a core is to "read into" the core a code value which will remain therein as long as desired, the "reading-in" pulse being effective to drive the core from saturation in one magnetic polarity to saturation in the opposite magnetic polarity. If and when this is followed by introduction of an actuating ("shift") pulse of proper polarity, the core flux will reverse and return to the original polarity, at the same time generating in an "output" or "readout" winding a current pulse indicative of the coded value previously read into the core. In this manner the coded information is shifted through the register, stage by stage, for delivery to a suitable outlet point.

Referring now to FIG. 1, the illustrated system is shown as involving magnetic cores 10, 11, and 12, constituting the three successive stages of a shift register. Digital information is supplied to the first stage by way of input winding "*a*" connected to signal input terminals 13. A signal pulse of predetermined polarity delivered to winding "*a*" will operate, by reason of the magnetic field set up by such signal pulse, to produce flux saturation of core 10 in one polar direction, indicative of a "1" value, for example. This "1" value will be "read out" of the core by the flux-reversing action of the shift pulse subsequently supplied to shift winding "*b*" of the core, there being one such shift pulse for each digital time interval, with the duration and time spacing of the shift pulses being determined by the repetition rate of application of the control signal energy to the driver element 14. Cores 10 and 11 have their shift windings (**10*b* and 11*b*) connected in series relationship in the line 15 leading from the B+ source 49 to the driver 14**, so that these cores (along with all other cores of the register, if there are more stages than the three illustrated) are triggered simultaneously during a predetermined part of each successive digital interval.

The "read-out" operation above referred to takes the form of current generation in the output or "read out" winding "*c*" of the core, such current generation being, of course, the usual electromagnetic result of the reversal of flux saturation from a condition of saturation in one polarity (signifying, say, a "1" value) to a saturation in the opposite polarity (signifying a "0" value). Since the amount of power that can be generated in the winding **10*c* during such a flux reversal is limited by the core design, it follows that the magnitude of the signal energy transferred to core 11 of the next succeeding stage of the register will be limited correspondingly, unless some means be provided for amplifying the power level during the transition period elapsing between commencement of the "read out" from core 10 and completion of the "read in" to core 11**. The present invention provides such amplification.

As shown in FIG. 1, the amplification is accomplished by inserting an additional power supply 16 and a semi-conductive crystalline element 17 of the transistor category in the intercore circuit in such a manner as to permit the extraction from auxiliary "booster" source 16 of whatever additional quantity of power is desired for the achievement of the functions assigned to the register. One method of insertion of these power boosting elements is to connect the emitter electrode of the transistor to one terminal of the read-out winding **10*c*, to connect the transistor base electrode to the grounded side 22 of source 16, and to connect the collector electrode of the transistor in series with both the "read-in" winding 11*a* and the power source 16, such series circuit also including serially connected components of the usual delay network 19, which network delays the arrival of the "read-in" pulse at core 11** until after the completion of the shift pulse application to the windings *b* of the several cores 10, 11, 12; the network 19, consisting of at least a condenser **19*a* and a resistor 19*b*, along with whatever other auxiliary units are commonly included in such delay networks. A second condenser 21 is also provided in a protective shunt path between the collector electrode and ground 22. These units are shown in FIG. 1 as repeated in the inter-core link between said core 11 and the next succeeding core 12, and in this new link the transistor 27 is correspondingly supplemented by provision of another power source 26 of a capacity adequate for whatever power output requirements are demanded of the output circuit 28, leading to the second-stage delay network 29**.

It will be understood that the signal energy supplied to the emitter electrode of transistor 17 (on any occasion of "read-out" from core 10 by way of winding "*c*") will be adequate to overcome the normal cutoff bias of the transistor, thus triggering the transistor to permit commencement of the process of signal transfer from winding 10c of core 10 to winding 11a of core 11, under whatever retardation conditions are imposed by delay network 19. The operation of transistor 27 will, of course, be similar.

In FIG. 2 the additional power supplied by power source 16 and transistor 17 is utilized to supply the required additional energy for operation of the cores 111, 211 and all other cores (if any) which may be interposed therebetween to constitute multiple branches of the second stage of the register, each of which branches has a "read-in" winding "a" connected serially to the collector electrode of transistor 17 by way of the interposed delay network 19. In FIGS. 1, 2, and 3 similar reference characters designate corresponding components.

The register of FIG. 3, like that of FIG. 2, includes multiple branch cores 111, 211 and possibly intermediate elements in its second stage, but it differs from FIG. 2 in that the transistor is inserted between the delay network 19 and the following cores, rather than before the network, as in FIG. 2. This post-network positioning has the advantage of lending itself to greater flexibility and accessibility for purposes of adjusting the amount of additional power to be supplied by the source 32 of biasing potential. On the other hand the FIG. 2 (or FIG. 1) pre-network positioning of the transistor has the advantage that the transistor may serve the purpose commonly served by use of a unidirectional impedance diode at this pre-network position, thus permitting elimination of such a diode as that indicated at 18 in FIG. 3.

By extension of the components indicated any of the registers shown may include additional stages and branches to perform any desired number of logical operations, without in any degree increasing the power demands upon the initial power supply source 49, the latter being required only to supply the relatively small amount of power necessary for delivering the shift pulses to the serially connected shift windings "b" of the individual primary and secondary cores of each register stage.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. A magnetic system comprising a plurality of magnetic elements, electrical windings on each of said elements, electrical circuitry including a pulse driver element for supplying signals simultaneously to a first winding on each of said elements, said circuitry including a first power source, and additional circuitry including a semi-conductive amplifier connected to provide a direct current connection inter-linking at least a pair of elements to form a branch circuit, said additional circuitry including a second power source, said semi-conductive amplifier intermittently operative for rendering said second power source effective to transmit power to the branch circuit elements.

2. A system comprising a single core-per-bit shift register having a plurality of field-sustaining elements, a transistor amplifier, electrical input and output windings on each of said elements, electrical circuitry for supplying signals simultaneously to a first winding on each of said elements, to produce field shifts in those elements having a predetermined field bias, said circuitry including a first power source, and additional circuitry adapted to provide a direct current connection through the sole intermediary of said transistor amplifier inter-linking each input winding on a first of said elements and an output winding on the other of said elements, said additional circuitry including a signal delay network and a second power source, said transistor amplifier rendering said second power source effective to transmit power from said first to the other of said elements whenever the first element has experienced a field shift.

3. A system comprising a single core-per-bit shift register having a plurality of field-sustaining elements having electrical windings on each of said elements, electrical input, output and shift circuitry for supplying signals from the output winding of one of said elements to the input winding on the other of said elements, said circuitry including a first power source, a semi-conductive amplifier, and additional circuitry inter-linking the input winding on the other of said elements being connected through the sole intermediary of said semi-conductive amplifier, said additional circuitry including a second power source, said semi-conductive amplifier intermittently operative for rendering said second power source effective to transmit power to the input winding of said other elements.

4. A system comprising a single core-per-bit shift register having a plurality of field-sustaining elements, electrical circuitry for supplying actuating impulses to said elements to produce field shifts therein whenever said elements have a predetermined field bias, said circuitry including a first power source, a semi-conductive device and additional circuitry to provide a direct current connection through the sole intermediary of said semi-conductive device inter-linking said elements, said additional circuitry including a delay network and a second power source connected in circuit with said semi-conductive device for rendering said second power source effective to transmit power from a first to the other of said field-sustaining elements in response to each field shift in the first of said field-sustaining elements.

5. A magnetic system comprising a plurality of magnetic elements, electrical windings on each of said elements, a semi-conductive device, electrical circuitry for supplying signals simultaneously to a first winding on each of said elements, said circuitry including a first power source, and additional branch circuitry to provide a direct current connection through the sole intermediary of said semi-conductive device inter-linking at least a pair of elements in a branch circuit, said additional circuitry including a delay network and a second power source, said semi-conductive device intermittently operative for rendering said second power source effective to transmit power directly to the branch circuit elements.

6. A system comprising a plurality of field-sustaining elements, electrical windings on each of said elements, a semi-conductive amplifier electrical circuitry for supplying signals simultaneously to a first winding on each of said elements, to produce field shifts in those elements having a predetermined field bias, said circuitry including a first power source, and additional branch circuitry providing a direct current connection through the sole intermediary of said semi-conductive amplifier inter-linking at least a pair of elements to form a branch circuit, said additional circuitry including a second power source and means for rendering said second power source effective to transmit power directly to the branch circuit elements whenever its associated first element has experienced a field shift.

7. A system comprising a plurality of field-sustaining elements, electrical circuitry for supplying actuating impulses to said elements to produce field shifts therein whenever said elements have a predetermined field bias, said circuitry including a first power source, a semi-conductive amplifier and additional circuitry providing a direct current connection through the sole intermediary of said semi-conductive amplifier inter-linking some of said elements to form a branch circuit, said additional circuitry including a second power source, said semi-conductive amplifier rendering said second power source effective to transmit power directly to the field-sustaining elements in said branch circuit in response to each field shift in the first of said field-sustaining elements.

8. A system comprising a single field-sustaining element constituting a first stage of intelligence transmission, a group of field-sustaining elements constituting a second stage of intelligence transmission, means including a first power source for producing changes in the fields of all of said elements, a delay network fed by said first stage of intelligence transmission, and means including an auxiliary power-boosting source and a semi-conductive device forming a direct current connection interposed between said delay network and said second stage to amplify the intelligence signals transmitted therebetween.

9. A system comprising a single core-per-bit shift register having field-sustaining elements constituting consecutively positioned intelligence transmission stages, a first stage including a first field-sustaining element, means including a first power source for producing changes in the fields of said elements, a delay network having a capacitive storage element connected to each of the other of said field-sustaining elements, and means including an auxiliary power-boosting source and a semi-conductive device fed by said power boosting source forming a series connection interposed between the first of said field-sustaining elements and the other of said field-sustaining elements and said delay network to amplify the intelligence signals transmitted therebetween.

10. A system comprising a single core-per-bit shift register having a field-sustaining element included in a first stage of intelligence transmission, a second stage of intelligence transmission including a plurality of field-sustaining elements, means including a first power source for producing changes in the fields of all of said elements, a semi-conductive element, and means including a signal delay network comprising a capacitive storage element and an auxiliary power-boosting source providing a direct current connection through the sole intermediary of said semi-conductive element interposed between said first and second stages to amplify the intelligence signals transmitted therebetween, and means responsive to said first-named means for controlling the conductivity of said semi-conductive element.

11. A system comprising a single core-per-bit shift register having a first stage of intelligence transmission including a field-sustaining element, a second intelligence transmission stage including at least one field-sustaining element, a semi-conductive element, means including a first power source series-connected shift winding for producing changes in the fields of said field-sustaining elements, and means including a delay network comprising a capacitive storage element and an auxiliary power-boosting source providing a direct current connection interposed between a single stage and the other of said stages to amplify the intelligence signals transmitted therebetween, said last-named means being connected through the sole intermediary of said semi-conductive element, and means responsive to said first-named means for controlling the conductivity of said semi-conductive element.

12. A system comprising a single core-per-bit shift register having a plurality of field-sustaining elements, electrical input, output and shift windings on each of said field-sustaining elements, a semiconductive device, electrical circuitry for supplying signals to the shift winding of said field-sustaining elements, said circuitry including a first power source, and additional circuitry through the sole intermediary of said semiconductive device interlinking the output winding on one of said field-sustaining elements to the input winding on the other of said field-sustaining elements, said additional circuitry including a second power source connected in circuit with said semiconductive device to transmit power to the input winding of the other of said field-sustaining elements.

References Cited in the file of this patent

UNITED STATES PATENTS

| | | |
|---|---|---|
| 2,591,406 | Carter | Apr. 1, 1952 |
| 2,622,213 | Harris | Dec. 16, 1952 |
| 2,652,501 | Wilson | Sept. 15, 1953 |
| 2,769,925 | Saunders | Nov. 6, 1956 |
| 2,824,697 | Pittman et al. | Feb. 25, 1958 |
| 2,966,661 | Haynes | Dec. 27, 1960 |

OTHER REFERENCES

"Static Magnetic Memory," Its Applications to Computers and Controlling Systems in Proceedings of Association of Computing Machinery, May 2 and 3, 1952, by An Wang, pp. 211 and 212 relied upon.